Oct. 22, 1957 V. C. STERRETT 2,810,396
DIFFERENTIAL FLOAT CONTROLLED VALVE
Filed Sept. 28, 1955 3 Sheets-Sheet 1

INVENTOR.
Vance C. Sterrett
BY
Shoemaker & Mattare
ATTYS

Oct. 22, 1957   V. C. STERRETT   2,810,396
DIFFERENTIAL FLOAT CONTROLLED VALVE
Filed Sept. 28, 1955   3 Sheets-Sheet 2
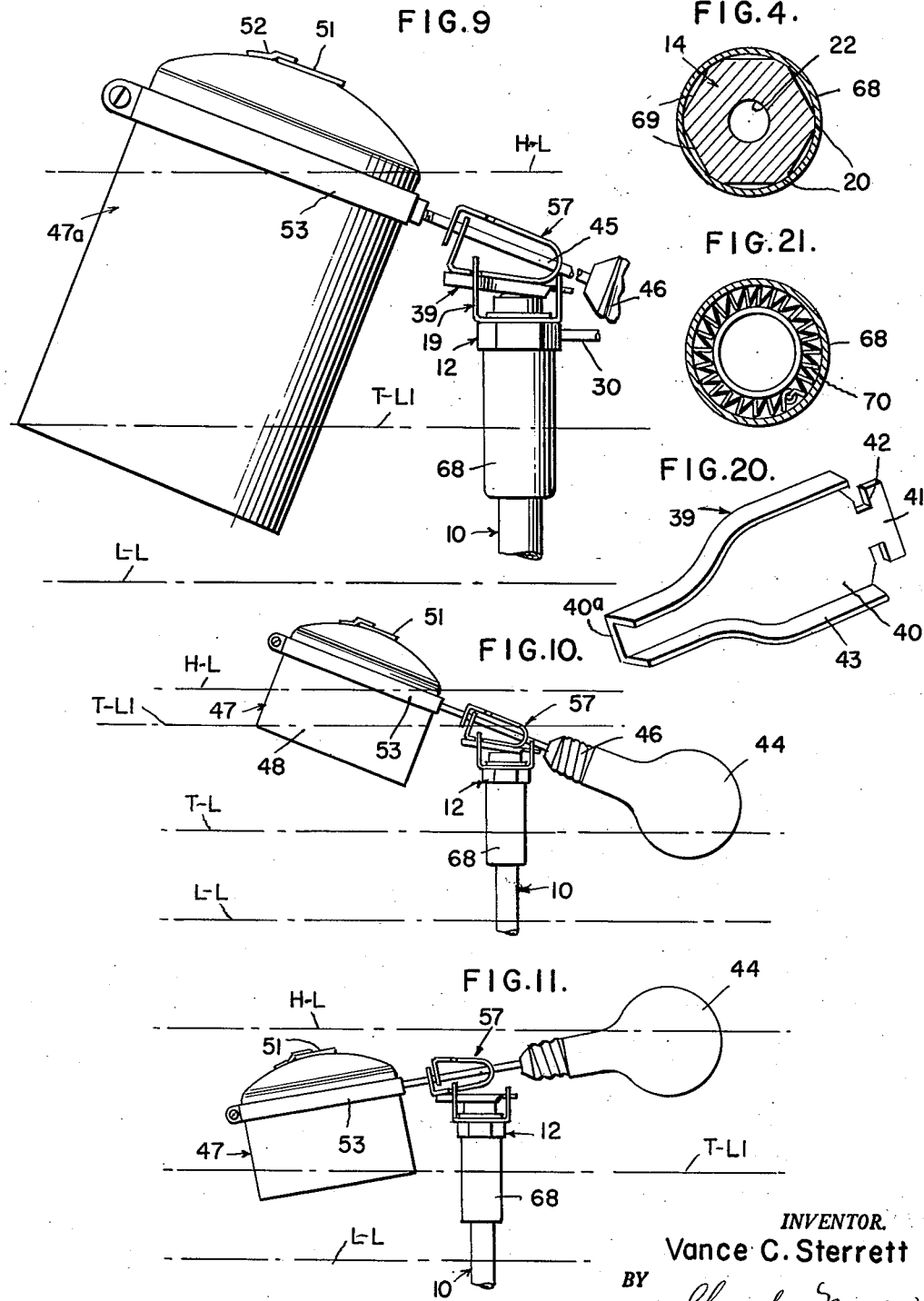
INVENTOR.
Vance C. Sterrett
BY
ATTYS.

Oct. 22, 1957  V. C. STERRETT  2,810,396
DIFFERENTIAL FLOAT CONTROLLED VALVE
Filed Sept. 28, 1955  3 Sheets-Sheet 3
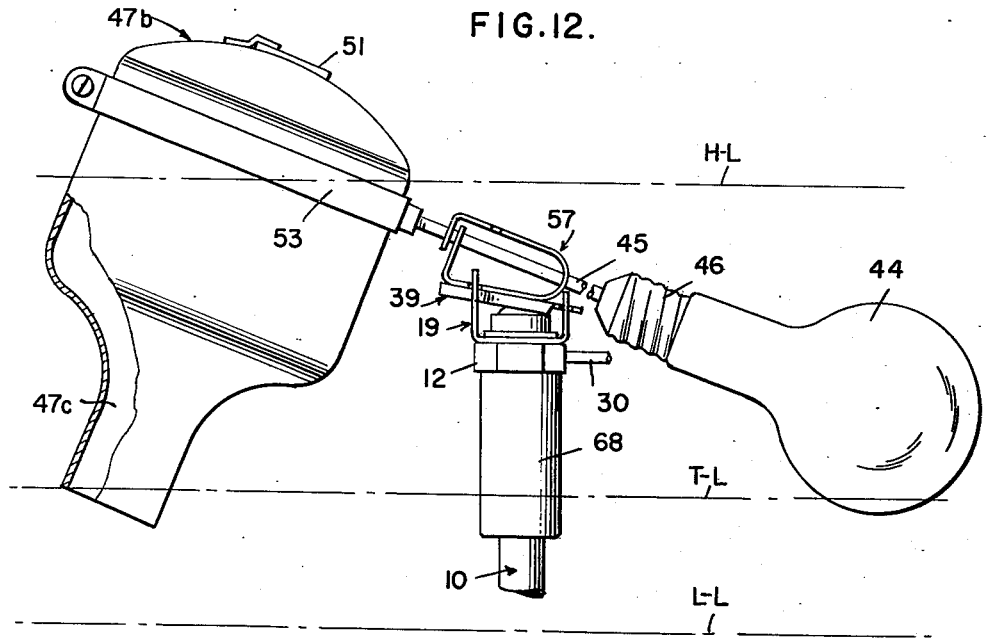
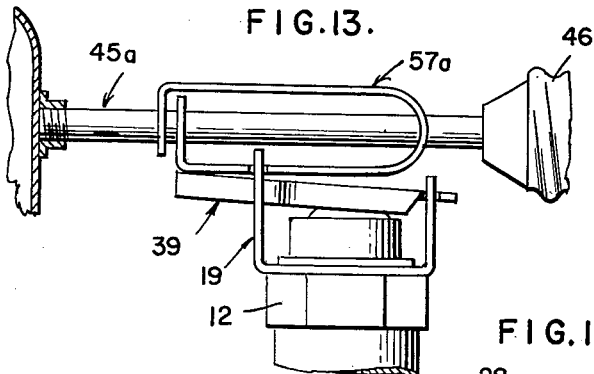
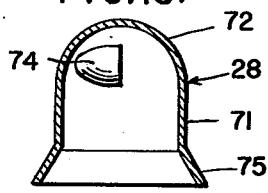
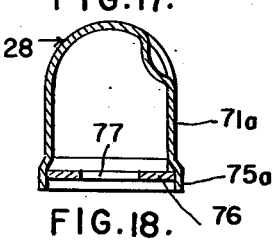
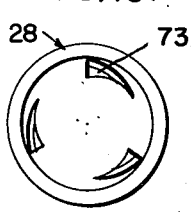
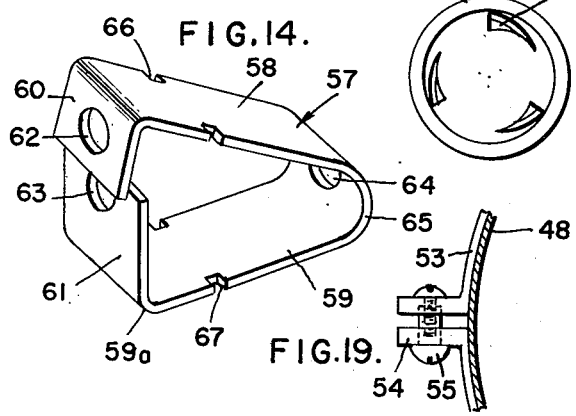
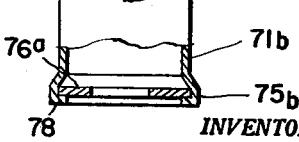
INVENTOR.
Vance C. Sterrett
BY Shoemaker & Mattare
ATTYS.

United States Patent Office 2,810,396
Patented Oct. 22, 1957

2,810,396

DIFFERENTIAL FLOAT CONTROLLED VALVE

Vance C. Sterrett, Logansport, Ind.

Application September 28, 1955, Serial No. 537,230

21 Claims. (Cl. 137—416)

This invention relates to the class of valves and control or actuating means therefor.

The valve and control means of the present invention are designed for use in storage tanks or receptacles for controlling the inflow or liquid after the tank has been emptied or partially emptied, whereby to maintain the tank filled or to effect the refilling of the tank after a complete emptying of the same or emptying beyond a predetermined level.

Tanks or water receptacles such as toilet flush tanks, cattle watering troughs and the like, are conventionally equipped with a water inlet pipe which has connected thereto an inlet valve which is opened and closed by movements of a float element connected therewith. In such structures, when the outlet to the tank, or receptacle, is opened, as the water level starts to drop and the float also starts to drop or go down, the inlet valve will begin to open. Thus the water is allowed to start running in as soon as the contents of the tank starts to run out or in other words, while the tank is emptying the inlet valve is open or partly open and water is running in.

One object of the present invention, in view of the foregoing, is to provide in a float controlled valve of the nature specified, a new construction by means of which the opening and closing of the inlet valve is made to occur rapidly at a predetermined low and high level, respectively, of the water in the tank, trough or other receptacle.

Another object of the invention is to provide in apparatus of the character stated, a float movement control means which functions to maintain the float elevated for a predetermined period while the tank is emptying and thereby maintain the inlet valve closed until the major portion of the contents of the tank has been discharged and then permit the float to drop quickly to effect the rapid opening of the inlet valve.

Still another object of the invention is to provide, in a manner as hereinafter set forth, in apparatus of the character stated, a float movement control means which is designed in a novel manner to maintain the float controlled inlet valve in a position whereby the full flow of the liquid therethrough into the tank is maintained until the tank is filled or nearly filled and then permit the float to rise rapidly under the buoyant action of the liquid and fully and quickly close the valve.

In conventional water tanks wherein a float controlled inlet valve is employed, as in flush tanks and the like, the inflowing water is gradually shut off as the float is raised by the water with the result that a pronounced sound or noise is created, the intensity of which changes or decreases as the valve is gradually closed. Accordingly, a further and very important object of the present invention is to provide a float controlled valve structure and float movement controlling means whereby the creation of noise by water flowing into a tank through the valve is suppressed or reduced to a negligible intensity by causing the opening and closing movements of the valve to take place substantially instantaneously only when the tank is substantially empty or substantially filled.

Also, in conventional water tanks or receptacles where a float is employed for effecting the opening and closing of the inlet valve in the pipe line supplying water to the tank, the valve is opened and closed relatively slowly. As a result, if there should be any particles of matter in the water they are likely to accumulate on the valve seat and be caught between the slow moving valve and the seat as the valve closes and thus clog the valve and interfere with the complete closing of the same. This condition is particularly likely to occur in water tanks or troughs on poultry farms where the demand upon the valve is very light and where the water may not be too clean. A further object of the invention is, accordingly, to provide a float controlled valve structure with a valve movement controlling means by which rapid opening and closing of the valve is effected so that a complete flushing and cleaning of the valve seat is obtained in each operation of the valve element.

Still another object of the invention is to provide, in a manner as hereinafter set forth, a new float controlled ball valve construction wherein a novel actuator is interposed between the valve ball and the float whereby the fast and positive seating of the ball is effected by the rising float.

A still further object is to provide an inlet valve construction having associated therewith a new means for passing liquid therethrough with a minimum of noise, when the valve is employed in a situation where reduction or elimination of sound from inflowing liquid is desirable.

Another object of the invention is to provide, in a manner as hereinafter set forth, a new valve unit in which the body or shell is designed in a manner whereby it is convertible from a simple form in which it is satisfactory for use in connection with tanks or troughs where noise of inflowing water is not objectionable and where use of a siphon tube is not required, to a form which suppresses or eliminates the sound of the inflowing water and the use of a siphon tube may be made, as for example, in toilet flush tanks or the like where such sound is objectionable and a siphon tube is required.

Another object of the invention is to provide a new and novel construction, in association with a water inlet control valve attached to a water inlet pipe, by means of which inflowing water, after passing the control valve, is guided in a smooth stream downwardly around the outer side of the inlet pipe, whereby splashing of the water is substantially eliminated with a resultant suppression or elimination of noise.

The foregoing and possibly other objects are attained by the provision of an inlet valve structure embodying a water pressure unseated valve ball with a float actuated levering element designed to press or force the ball to its seat to close the valve. Operatively connected with the float is a trap chamber which, by trapping air during the filling of the tank, functions to prevent the float from rising with the water level until the tank is substantially full. When the tank has filled to the required level, the air trapped in the trap chamber is put under sufficient pressure by the water rising in the chamber to effect the opening of an exhaust valve forming a part of the trap chamber, thereby permitting the air to escape. This allows the float connected with the chamber to rise rapidly and quickly close the inlet valve. After the tank has been filled and the float has risen to the top of the water so that the valve is shut, the trap chamber remains filled with water. When the tank outlet valve is again opened to permit the contents of the tank to pass out, the water is retained in the trap chamber during the outflow of the water from the tank. The trap chamber has an open bottom and when the water level in the tank reaches the open bottom of the trap chamber or, in other words, when the open bottom of the chamber breaks the surface, the water in the chamber is permitted to escape. Up until this time the water weighted trap chamber keeps the float up, or raised, and the water inlet valve is kept closed. As soon as the water escapes from the chamber into the tank the weight of the float and the force applied to the valve ball by the water in the water line combine to overbalance the lightened tank and the float drops to effect the opening of the valve.

Other objects and advantages of the invention will become apparent as the description of the same proceeds.

The invention will be best understood from a consideration of the following detail description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claims.

In the drawings:

Fig. 4 is a horizontal section taken on an enlarged scale substantially on the line 4—4 of Fig. 1;

Fig. 6 is a view in side elevation of the valve body;

Fig. 9 is a view in side elevation of the invention showing the use of a modified trap chamber and also showing the parts in valve open position;

Fig. 10 is a view illustrating the positions of the float and trap chamber structure illustrated in Fig. 1, when the water level has dropped and the trap chamber has emptied, permitting the float to drop and open the inlet valve;

Fig. 11 is a view illustrating the elevation to which the float rises after release of air from the trap chamber when the float rod engaging clip is used in reverse position upon the valve ball actuating lever;

Fig. 12 is a view corresponding to Fig. 9, but showing another form of trap chamber which may be used in association with the float where a slower release of water from the chamber may be desirable;

Fig. 13 illustrates the application of the present invention in combination with a clip of the form disclosed in Patent No. 2,487,490;

Fig. 14 is a view in perspective of the float rod engaging clip;

Fig. 15 is a plan view of the noise suppressor thimble designed for use in the valve body as illustrated in Fig. 7;

Fig. 16 is a longitudinal sectional view through the noise suppressor;

Fig. 17 is a sectional view through one modified form of the noise suppressor;

Fig. 18 is a sectional view through a second modified form of noise suppressor;

Fig. 19 is a fragmentary section taken substantially on the line 19—19 of Fig. 1;

Fig. 20 is a view in perspective of the ball valve actuating lever as seen from the under side;

Fig. 21 is a sectional view taken substantially on the line 21—21 of Fig. 1 and on an enlarged scale.

Figure 1:
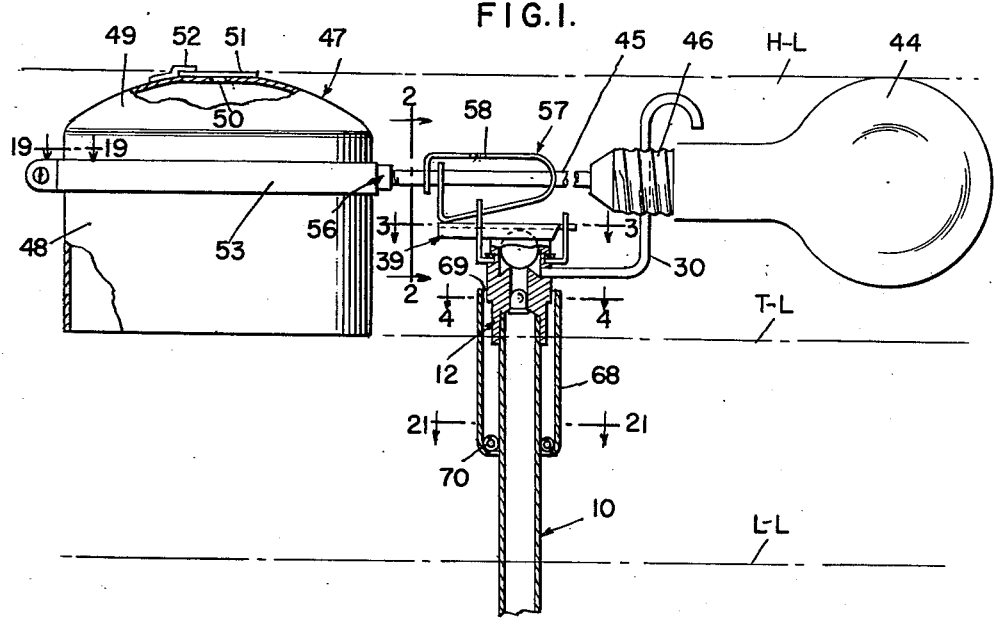
Fig. 1 is a view illustrating partly in side elevation and partly in section one embodiment of the present invention applied to or connected with a water inlet pipe for a tank, trough or other receptacle, and showing the position assumed by the float and trap chamber when the tank or receptacle is filled.
Figure 2:
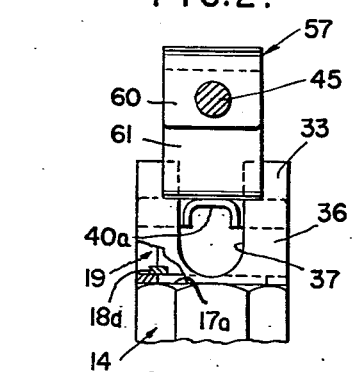
Fig. 2 is a sectional view taken substantially on the line 2—2 of Fig. 1 on an enlarged scale.
Figure 5:
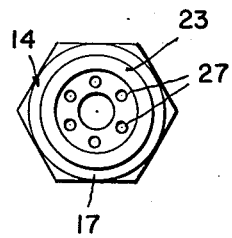
Fig. 5 is a view in top plan or of the top end of the valve body showing the water inlet and outlet passages.
Figure 3:
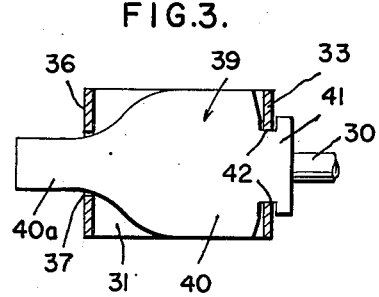
Fig. 3 is a horizontal section taken substantially on the line 3—3 of Fig. 1 on an enlarged scale.

Referring now more particularly to the drawings, the description of the invention will be directed first to the embodiment illustrated in Fig. 1.

In Fig. 1 the numeral 10 generally designates a water inlet pipe such as is found in toilet flush tanks or other tanks or troughs in which water is introduced through a float controlled valve.

On the upper end of the water inlet pipe, which pipe is normally disposed in vertical position in the tank with which it is associated, there is secured the ball valve structure forming part of the present invention and which structure is generally designated 12. The ball valve structure comprises a single or one-piece body, shown in Fig. 6, which is generally designated 14. This body has a central portion 15 which may be of hexagonal external form as shown and extending downwardly from the central portion is the skirt portion 16 which is of smaller overall diameter than the central portion 15 and of circular or cylindrical character.

Figure 8:
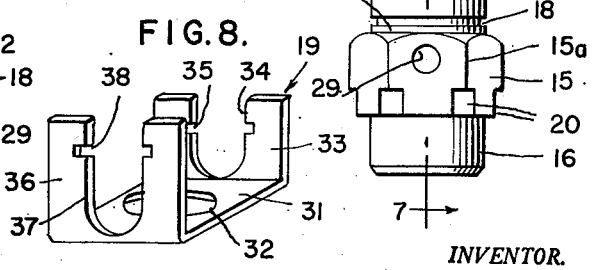
Fig. 8 is a view in perspective of the lever supporting bracket which is mounted upon the valve body.

Extending upwardly from the central portion 15 of the body is the head 17 which may also be of circular form. This head is of smaller diameter than the portion 15 so that the top of portion 15 forms a shoulder 17ª. Just above this shoulder the head has therein an encircling groove or slot 18 in which is engaged a retaining ring 18ª for securing the hereinafter described bracket, shown in perspective in Fig. 8 and generally designated 19, upon the body 14.

As shown more particularly in Fig. 6, the lower ends of the corners 15ª which define the facets of the hexagonal body, are cut away or flattened through a portion of the length of the body central portion, such cut away areas being designated 20. The purpose of these cut away areas will be hereinafter set forth.

Figure 7:
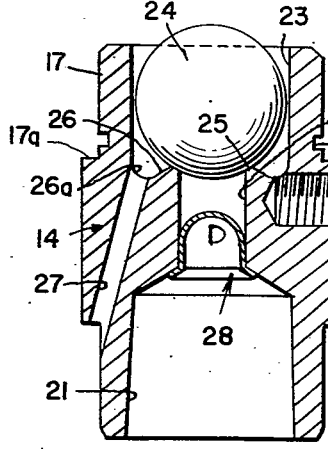
Fig. 7 is a vertical sectional view taken substantially on the line 7—7 of Fig. 6 and on a greatly enlarged scale through the valve body, showing a noise suppressor inserted therein and showing the valve ball in closed or seated position.

Referring particularly to Fig. 7, the valve body 14 has formed through the lower or skirt portion 16 the passage portion 21 in which is received the top end of the water inlet pipe 10. The pipe 10 may be secured in the passage portion 21 of the valve body by screw threads or by sweating the body on the pipe or in any other suitable manner so that the body is maintained firmly in place.

Leading from the upper end of the passage portion 21 through the central part 15 of the body is the bore or passage 22 of reduced diameter and this opens at its upper end into the upwardly opening circular chamber 23 which is designed to receive the valve ball 24. This valve ball may be formed of metal, plastic, hard rubber or any other suitable material, preference being had for a material such as hard rubber or plastic because of the character of such materials which would result in the seating of the ball without noise.

The ball chamber is of an inside diameter only slightly greater than the valve ball 24 so that the ball will not have any material lateral movement therein.

The bottom of the chamber 23 is substantially frusto-conical whereby there is provided an annular edge 25 which the ball 24 engages when it is seated. This formation insures tight closing of the valve when the ball is resting on this edge seat.

By reason of the frusto-conical formation of the bottom of the ball chamber the valve seat 25 is encircled by the downwardly sloping encircling shoulder 26 and this shoulder merges, preferably by a rounded corner 26ª, with the wall of the chamber.

Formed through the central portion 15 of the body is a plurality of water outlet passages 27 which at their upper ends open into the ball chamber through the rounded corner 26ª and at their lower ends these passages open through the bottom part of the central portion 15 of the body, as is clearly shown in Fig. 7.

As hereinbefore stated, the present invention is designed for use in connection with watering troughs or other troughs or tanks where the necessity for suppressing noise is not of importance and accordingly it is contemplated to provide the valve body 14 in the form thus far described. In this form the body may be used in watering troughs or in such other locations. However, when the invention is to be employed in situations where it is desirable that the noise of water movement be suppressed or eliminated as, for example, in toilet flush tanks, the valve body 14 will be provided with the hereinafter described noise suppressor thimble, such as that shown in position in the valve body in Fig. 7, and generally designated 28, and the valve body will also be drilled and tapped as indicated at 29 forming a lateral opening for the attachment thereto of the conventional siphon tube, a portion of which is shown in Fig. 1 and designated 30.

The inner end of this port will communicate with the ball chamber 23 so that when the ball is raised from its seat a portion of the water may flow into the siphon tube in the usual manner.

The control means for the valve ball 24 embodies the bracket 19 hereinbefore referred to. This bracket comprises a flat central plate portion 31 having therethrough an aperture 32 of a size to snugly receive the circular head below recess 18 and rest upon the shoulder 17ª. The retaining ring 18ª, secured in the recess 18, maintains the bracket in position. At one end of the plate 31 are two spaced upstanding legs 33 which may comprise integral upturned portions of the plate, providing between them a central slot 34 and the opposite edges of this slot have formed therein the notches 35.

At the opposite end of the plate are two upstanding legs 36 similar to but taller than the legs 33 and these latter legs 36 may also be formed as integral portions of the plate material. These taller legs define an upwardly opening slot 37 and the opposed edges of the legs or edges of the slot are provided with the opposite notches 38.

The bracket 19 supports a lever plate which is generally designated 39. This lever plate comprises an elongate flat body 40 having one end reduced in width forming the terminal arm 40ª while the opposite end of the plate 40 is of reduced width and formed as a T 41 providing between the transverse head portion and the adjacent end of the plate body the opposite notches 42. These notches 42 of the lever plate are interengaged with the notches 35 of the legs 33 of the supporting bracket and the opposite end or arm 40ª of the lever plate passes between the legs 36 of the supporting bracket and lies below the notches 38 thereof.

While the lever plate body portion 40 may be formed in any suitable manner, it is preferred that it be stamped from a single piece of material and that it be provided with the side flanges 43 to give the same rigidity. In the set up structure these flanges will be directed downwardly as is clearly shown in Fig. 1 and as also shown in this figure the wider portion of the plate body rests against the top of the valve ball 24 when the lever plate is in horizontal position. In this position as shown in Fig. 1 the ball will be held on its seat. However, the lever plate is loosely connected between the legs 33 so that it may swing up and down or in other words, the arm end 40ª thereof may swing between the legs 36 either to press the ball on its seat or remove such pressure to permit the pressure of water in the admission pipe 10 to lift the ball and flow into the tank through the passages 27.

The numeral 44 designates a float member which is here shown as comprising a large size incandescent lamp bulb. This float is adapted for connection with a float rod 45 in a suitable manner as, for example, by employment of a conventional threaded metal socket 46 which may be secured to one end of the rod and into which the threaded end of the incandescent bulb may be secured. Cooperating with the float 44 is an air lock or trap chamber which is generally designated 47. This air lock or trap chamber, in the embodiment of the invention illustrated in Fig. 1, is in the form of an inverted bowl and may be formed or fabricated of a suitable lightweight material such as thin aluminum, brass, plastic or the like.

The air lock or trap chamber 47 may take several forms, as are here illustrated in Figs. 1, 9 and 12. In the form shown in Fig. 1 it comprises a short cylindrical body 48 closed at the top end by the dome-like head 49. This head is provided with a small air escape aperture 50 and secured upon the top of the head to cover the aperture is a relatively large flat flap valve 51 which may comprise a disc of rubber or other suitable material secured in place by a clip 52 which is attached to the head 49 and overlies part of the edge of the disc so that the major portion of the disc can rise from the top of the domed head to permit air to escape under certain operating conditions as hereinafter set forth.

The float rod 45 has its other end attached to the air lock or trap chamber 47 in a suitable manner. An attaching means here illustrated comprises a split band 53 which encircles the cylindrical wall 48 and has two opposing end portions 54 as shown in Fig. 19 which may be drawn together in a suitable manner by means of the telescoping screw elements 55.

Forming a part of the split band 53 is a threaded nut 56 in which said other end of the float rod 45 is engaged.

The float rod 45 with the float 44 and the air lock or trap chamber 47, are mounted upon a spring clip generally designated 57, which is rockably coupled with the bracket 19 to bear upon the lever plate 39 when rocked in one direction with the elements mounted thereon and to move away from the lever plate when reversely rocked.

As shown in Fig. 14, the spring clip 57 is formed from a single piece of metal of desired resiliency and of predetermined length and width. This piece of metal which is in the form of a band or ribbon strip is bent or folded upon itself to provide the two legs 58 and 59. A short portion of the leg 58 is turned to extend at right angles forming the short tongue 60 while a longer portion of the leg 59 is turned to extend at right angles forming the longer tongue 61. The short tongue 60 has an opening 62 formed therethrough while the longer tongue has a corresponding opening 63 formed therethrough close to its free end. As shown, the legs 58 and 59 are of such length that the tongues may be brought into overlapping relation when the legs are pressed together so as to bring the openings 62 and 63 in alignment and when so aligned they are also in alignment with the corresponding opening 64 formed through the looped or folded portion 65 of the clip.

The leg 58 of the clip is provided in the opposite longitudinal edges with the transversely aligned notches 66 while the leg 59 is provided in its longitudinal edges with transversely aligned similar notches 67. The clip 57 is attached to the bracket 19 by interengaging the notches of one leg of the clip with the notches 38 of the legs 36 of the bracket and this interengagement of the notches of the clip leg and the bracket legs is sufficiently free or loose to permit the clip leg to rock freely in a vertical plane.

The clip 57 is attached to the float rod 45 by extending an end of the rod, such as the end which is threadably engaged in the nut 56, through the opening 64 and then through the openings 62 and 63 after they have been brought into alignment by springing the legs 58 and 59 toward one another to the proper extent. The tendency of the legs 58 and 59 to spring apart will then produce a binding or frictional coupling between the tongues 60 and 61 and the float rod 45. It will be readily seen from this that the clip can be readily adjusted on and lengthwise of the float rod to place it in the best position for producing the desired action when the parts are assembled.

After the clip has been attached to the float rod the clip is connected with the taller legs 36 of the supporting bracket with the rounded or bent end 65 of the clip toward the shorter legs so that the opposite end of the clip leg which is engaged with the bracket legs 36 may bear upon the reduced arm portion 40a of the lever plate when the clip is oscillated by the float being raised on the surface of water rising in the tank.

In Fig. 1 the assembly is shown with the leg 58 of the float rod engaging clip in parallel relation with the float rod. The other leg 59 is accordingly disposed obliquely to the rod. Thus when the rod is approximately horizontal the clip will be oscillated so that the end of the leg 59 where it joins the tongue 61 forms a fulcrum 59a which presses down on the arm 40a and effects the closing of the valve.

Reference has hereinbefore been made to the employment of a noise suppressing device in the form of a thimble 28 which is secured in a manner hereinafter described in the axial passage 22 of the valve body 14. In addition to this noise suppressing device a means for preventing the development of noise by water being discharged into the tank or receptacle by way of the passages 27 in the valve body, is provided in the form of a tubular skirt 68. This skirt is of a diameter to encircle the lower part of the central portion 15 of the valve body 14 where the smaller corner facets 20 are formed. The skirt surrounds the water pipe 10 and receives the lower end of the valve body 14, being frictionally secured to the surfaces 20 of the valve body. When attached in this manner to the lower part of the valve body it will be seen upon reference to Fig. 4 that there are provided a series of openings 69 between the top edge of the skirt and the faces of the portion 15 of the valve body between the small facets 20. The top end of the skirt lies above the lower ends of the water inlet passages 27 and thus as the water flows from under the valve ball 24 into the chamber 23 it will pass down the passages 27 and into the skirt 68, then flowing down the outer side pipe 10. The provision of the openings 69 allows for air to pass into the tube so that there will be no hindrance to the down flow of the water into the skirt from the passages 27. The lower end of the skirt has therein a coiled wire ring 70 which acts to break up the liquid and soften any noises which might be caused by its impact with the stand of water in the tank.

As hereinbefore referred to, the thimbles 28 when inserted in the portion 22 of the passageway through the valve body 14 also assist in quieting the movement of water through the valve. These thimbles are made as a separate part of the valve structure so that if the valve is used in connection with a watering trough or some other type of receptacle where the production of noise flowing through the valve is unimportant, the thimble need not be used. If the valve is used in a flush tank, however, the valve body may have the thimble applied thereto. This thimble is in the form of a pressed metal body of cylindrical form and of an outside diameter to fit tightly in the valve body passage 22. The cylindrical portion of the thimble is designated 71 and one end of the thimble has the substantially semi-spherical wall 72 in which are formed a series of openings 73 disposed in a circular arrangement as shown in Fig. 15. These openings may be formed in any suitable manner but preferably are produced by pressing in the portions 74 of the metal of the thimble as indicated in Fig. 16. Thus the impressed portions 74 form shallow inwardly projecting cups which cover the openings 73 and cause the liquid entering the thimble to pass through the openings in a circular or whirling path.

The open end of the thimble has the wall portion outwardly flared as indicated at 75. Thus when the thimble is pressed into the lower end of the valve body passage 22 this flared portion 75 engages the inner end of the enlarged portion 21 of the valve body passage and limits the movement of the thimble into the passage 22.

Figs. 17 and 18 illustrate two other forms of thimble which may be employed. In the form illustrated in Fig. 17 the lower or open end of the body 71a has the circular skirt 75a of a diameter slightly larger than the diameter of the wall portion 71a and in this skirt is fixed a disc 76 having a small central opening 77. This type of thimble functions to retard the passage of the water slightly more than the thimble illustrated in Fig. 16 would do.

In the form of the thimble shown in Fig. 18 a slightly different arrangement is employed for securing the apertured disc in place in the open end, from that shown in Fig. 17. In this form the wall 71b has the open end enlarged slightly as indicated at 75b and then flanged inwardly as indicated at 78 to secure the disc, here designated 76a, in position.

Figs. 1, 9 and 12 illustrate three different forms of air lock or trap chamber. These different forms of the chamber may be employed under different operating conditions or in accordance with the manner in which it is desired that the device function for opening and closing the water inlet valve. In the form illustrated in Fig. 1 the air trap chamber or differential chamber is short as compared with the chamber illustrated in Fig. 9 which latter chamber is generally designated 47a and except for the difference in length is of the same construction as the chamber 47. In Fig. 12 the form of the chamber, which is generally designated 47b, is altered in the lower portion where it will be seen that while the overall length of the chamber may be approximately the same as the chamber 47a, the lower half is reduced in diameter forming the central tubular extension 47c.

In the several figures illustrating the complete structure in its different embodiments, three different water levels are indicated by broken lines and identified as follows: The upper most line of each of the figures designates the high water level and is identified by the characters H-L. The low level for the water in the receptacle in which the device is employed is indicated in each of the different figures by the reference characters L-L and an intermediate level is indicated and identified by the reference characters T-L, which will be referred to as the trap level.

Referring now to Fig. 1, it will be seen that the float 44 is completely submerged and thus exerts its maximum buoyant force for holding the valve in closed position. Also the differential chamber or trap chamber 47 is completely submerged, being below the high level line H-L. The trap chamber in this position is completely filled with water. If now the receptacle outlet, not shown, is opened to permit the water to flow out as the level is gradually reduced or drops, the differential chamber or trap chamber breaks above the liquid level but the liquid or water within the chamber is trapped due to the fact that the flap valve 51 is in closed position over the opening 50 and having been moistened by its submergence in the water, it will adhere closely to the surface of the chamber wall and thus prevent the entrance of air into the chamber through the opening 50. As the liquid level in the chamber continues to drop, more weight is added to the trap chamber by reason of the entrapped water therein, holding the valve ball tightly on its seat. In other words, as the float 44 loses buoyancy, the chamber 47 gains or increases in weight, the buoyant force of the float being traded for direct gravitational force in such a manner that the valve is never allowed to open during the process.

When the liquid level has dropped to the trap level line T-L, which corresponds with or registers with the open bottom end of the chamber 47, or to a corresponding line T-L in Figs. 9 and 12, the open bottom of the chamber breaks the surface or, in other words, air will enter into the chamber through the open bottom and the load of water therein will be immediately and completely discharged. Accordingly, the force which has previously held the valve in closed position is removed and the valve will snap to open position by the weight of the float 44 overcoming the weight of the differential chamber 47 together with or assisted by the force applied against the valve ball by pressure of the water in the supply line.

The valve is now in open condition and the float and differential chamber and associated parts will be in the position illustrated in Fig. 10. The valve being open, the water will start to flow into the tank or receptacle in which the device is installed and as the liquid level rises it will begin to submerge the differential or trap chamber and when it reaches the level designated T-L1, air will be trapped in the chamber. As the level continues to rise, the entrapped air will be more and more compressed and this condition continues to increase until the air pressure within the trap chamber or differential chamber becomes strong enough to lift the flap valve 51 and effect its escape from the chamber.

As above set forth, the flap valve having been made moist, its attachment to the surface of the tank will be strongly retained until a considerable amount of air pressure is developed in the chamber. During this time that the air is being compressed in the chamber, the float will be held down as shown in Fig. 10 and as is also shown in Figs. 9 and 12, but as soon as the trapped air is released or escapes the buoyant action of the float will cause it to rise to the surface and the valve will be completely and rapidly closed. The parts will then be restored to the position shown in Fig. 1.

It will be seen from the foregoing that the valve is either in a fully open or fully closed position as when the tank or receptacle is completely emptied or completely filled, respectively, and is never in an intermediate or partly open condition to allow the water to seep or flow in gradually.

With respect to the height tof the differential chamber, if the height or length of the chamber is increased, as it is shown in Fig. 9, the differential difference increases, causing a greater distance between the upper or high level of the liquid in the tank and the lower level.

If it is found that the air pressure builds up too fast, then the differential chamber may be made as illustrated in Fig. 12 so as not to entrap such a large volume of air.

The different forms or shapes of the differential chamber are determined in accordance with the various applications which may be made of the invention. It will be seen that the differential chambers are adjustable with respect to the band 53 by which the chamber is attached to the float rod and once the proper position of the band on the differential chamber is determined with respect to the height of the chamber in a given installation, the band can be omitted and the nut 56 can be secured directly to the side of the chamber at the determined location.

In my prior Patent 2,487,490 a type of clip is illustrated for securing the float rod in position with respect to the valve, wherein the sides or legs of the clip are in parallel relation. This clip is shown in Fig. 13 wherein it is generally designated 57ª, in association with the valve and differential chamber of the present invention. In this Fig. 13 the valve is shown in open position and the clip 57ª, the float rod 45ª and the attached float and differential chamber are all in horizontal position and it will be apparent that when the receptacle in which the invention is installed is filled so that the float is elevated to effect the closing of the valve, the float will extend upwardly in an oblique direction with respect to the pipe on which the valve is mounted. The clip device 57 of the present invention is so designed or constructed that it may be employed in the reverse or inverted position from that in which it is illustrated in Fig. 1 and other figures and Fig. 11 illustrates this inverted arrangement of the clip which allows the float to rise to a greater elevation or project above the surface of the water in the receptacle when the valve is closed.

From the foregoing description it will be readily seen that there is provided by the present invention a new and novel float controlled valve structure wherein the valve is caused to open and close rapidly and with a snap action only when the tank or receptacle in which the structure is installed has been completely or nearly completely emptied or has reached the filled or nearly filled condition. Between these extremes the valve remains fully and tightly closed or fully opened. No intermediate position of the valve is permitted which would allow slow inflow or outflow of the water, or in other words, the valve is never at a seeping position.

Also due to the novel construction of the valve unit it will be seen that the body may be provided initially, as hereinbefore stated, without the port 29 in which a siphon tube is engaged and without the water flow restricting thimble so that it may be used in watering troughs or other places of like character, but the body may be readily converted for use in a flush tank installation by drilling and tapping the port 29 and by installing the noise suppressing or eliminating thimble therein.

In Fig. 1 the siphon tube or pipe has been shown as leading from the side of the valve body 14 and directly beneath the float rod 45 for convenience in describing the construction. It will be understood that when the invention is installed in a tank or recepacle the bracket may be turned with respect to the valve body so that the siphon tube and the float or float rod will not be in positions to interfere one with the other.

Because of the quick action of the valve in the present structure due to the action or control of the differential chamber 47, a certain amount of jar will be applied to the structure which will also assist in breaking up any particles of material which may have lodged on the valve seat, so that in the closing of the valve when the ball is rapidly applied to the seat such particles will be dislodged or mashed and when the valve opens the particles will be washed away by the inflowing water. This deposit of matter on the valve seat is particularly likely to occur where the device is used in connection with wells in rural districts since pipe lines are usually of smaller diameter than in city water lines and no slow settling out of the particles which may be carried in the water is likely to occur. Also well water is more than likely to contain a considerable quantity of iron and if an ordinary float valve is employed, particularly where the demands upon it are light, the iron oxide which forms will collect on the valve seat and build up thereon so that eventually the valve will be unable to shut off the flow entirely. This deposit is porous and the valve when placed in closing position will rest upon the deposit and water will seep through it even though the valve may be firmly pressed toward the seat. If the ball float controlling such a valve is pushed down and let go several times so as to quickly move the valve relative to its seat and thus jar the assembly, the deposit on the valve seat will generally be broken away. With the present invention the rapid action which is imparted to the valve ball in the opening and closing movements thereof produces this jarring action and also, as before stated, the ball will mash or break up the deposit so that the valve seat will be kept clean.

In the illustration of the present invention, the water inlet pipe or supply line 10 has been illustrated in an upwardly extending position indicating that the water supply flows in from the lower part of the tank and the ball valve unit is mounted on the upper end of the pipe. It is also contemplated to employ this structure in tanks where the supply line or pipe may come down from above the tank, in other words, where the supply line would be inverted. It will be seen that when the apparatus is used in inverted position the buoyant forces will be opposite to that required to move the valve into closed position, but this is remedied by reversing the entire float rod assembly. In other words, considering Fig. 1, for example, if the pipe line 10 came down from the upper part of the tank so that the ball valve would be attached to the lower end of the pipe, the float 44 would be reversed or placed at the opposite side and the differential chamber would be inverted from the position in which it is now shown.

I claim:

1. In a float actuated inlet valve mechanism for a receptacle such as a tank, trough and the like, an upright liquid inlet pipe, an inlet valve attached to said pipe for controlling inflow of liquid therethrough, a shiftable actuator for said valve having a valve closed position and a valve open position, float means operatively coupled with said actuator, and means operatively coupled with the float means for alternately trapping water and air in the emptying and filling of the tank to hold the float against downward valve opening movement for a predetermined period during emptying of the receptacle after said means has trapped water and for holding the float for a predetermined period against rising on inflowing liquid to close the valve after said means has trapped air.

2. In a float actuated inlet valve mechanism for a liquid receptacle such as a flush tank, trough and the like having an upstanding inlet pipe, an inlet valve connected to the pipe and having an open position and a shut-off position, float controlled means operatively coupled with the valve for regulating the opening and closing of the same, and means connected with and constraining the float controlled means to impart a snap action to the opening and closing of the valve, and embodying a hollow open bottom body constructed and arranged to trap air by liquid rising in the receptacle and in the body, air pressure actuated means carried by the body for releasing trapped air from the body whereby to effect the said snap action closing of the valve, said air pressure actuated means functioning to retain liquid in the body during the lowering of the liquid level in the receptacle until said open bottom breaks the surface of the liquid whereby to effect the said snap action opening of the valve.

3. In a float actuated inlet valve mechanism for a liquid receptacle such as a flush tank, trough and the like having an upstanding inlet pipe, an inlet valve connected to the pipe and having an open position and a shut-off position, float controlled means operatively coupled with the valve for regulating the opening and closing of the same, and means connected with and constraining the float controlled means to impart a snap action to the opening and closing of the valve, said float controlled means includes a float rod and the last stated means embodies a hollow body attached to an end of said rod and having an open side directed downwardly in the receptacle and an outwardly opening air pressure actuated air release means in the top of the hollow body.

4. In a float actuated inlet valve mechanism for a liquid receptacle such as a flush tank, water trough and the like having an upright liquid inlet pipe discharging therein, a valve unit secured to the discharge end of said pipe and embodying a casing through which the liquid passes and a free moving valve element movable from a seat to open valve position by pressure of liquid entering the casing and restricted by lateral contact against a part of the casing to rectilinear movement relative to said seat, a pivoted lever mounted on and transversely of the valve casing and lying across and applying pressure on the valve element tending to close the valve, a lever actuator overlying and engaging the lever laterally of the valve element, means supporting the actuator for rocking movement, said actuator when rocked in one direction moving the lever to valve closed position and when oppositely rocked freeing the lever for movement to valve open position, a float, and means connecting the float with the lever actuator for rocking the latter.

5. The invention according to claim 4, with an air trapping and releasing means operatively coupled with the float and operating to alternately trap and release air by the rise and fall of liquid level in the receptacle to restrain movements of the float by the rise and fall of the liquid level and impart a snap action to the opening and closing of the valve.

6. An inlet valve and control mechanism comprising a valve unit including a body having a liquid passage therethrough, the passage having one end portion formed for connection with an end of a liquid supply pipe and having an opposite end portion enlarged to provide a valve ball chamber, a valve ball in said chamber having a diameter slightly less than the diameter of the chamber whereby lateral movement of the ball therein is prevented, said ball closing the adjacent end of part of the passage lying between said end portions, said body having a liquid discharge passage extending obliquely of the first passage and opening at one end into the lower part of the ball chamber at one side of and below the said end of the passage closed by the ball, said liquid discharge passage opening at its other end through the outer side of the body laterally of said one end portion, and means for controlling the movement of said valve ball in said chamber relative to the said adjacent end part of the first passage.

7. The invention according to claim 6, with a sound suppressing element removably inserted in the end of the said part of the passage lying between said end portions remote from the ball chamber.

8. An inlet valve and float control mechanism comprising a valve unit including a body having a liquid passage therethrough, means for coupling the body at one end of the passage to a liquid supply pipe, a valve ball, means for supporting the ball in closing position relative to the other end of the passage, a bracket mounted on the valve body adjacent to the valve ball, said bracket embodying two spaced arms between which said valve ball is located, a lever pivotally attached to one of said arms and extending toward and beyond the other arm and across and in engagement with the valve ball, a thrust element rockably supported on said other arm above and engaging the lever, said thrust element when rocked in one direction forcing the lever against the ball to press the latter to valve closing position, a float, and means coupling the float with the thrust element for imparting rocking movement thereto.

9. The invention according to claim 8, with means connected with the last stated means on the side of the thrust element opposite from the float for holding the float elevated and in valve closed position for a predetermined period after withdrawal of the buoyant action of the liquid and for holding the float in valve full open position for a predetermined period following submergence of the float in the liquid.

10. The invention according to claim 9, wherein the said means opposite the float comprises a hollow body having an under portion provided with a downwardly directed opening and having an air escape aperture in its top and a valve means for said aperture which opens by pressure of air in the hollow body.

11. The invention according to claim 8, wherein said thrust element comprises a length of spring metal of band form bent upon itself to form two legs each terminating in an angular tongue, said tongues being in overlapping relation and one being longer than the other, the band having an aperture through the bend portion thereof and the tongues having apertures arranged to be brought into alignment by springing the legs toward one another, and said means coupling the float to the thrust element comprising a rod extending through the first aperture and through the aligned tongue apertures.

12. An inlet valve and float control mechanism comprising a valve unit including an elongate body having a passage longitudinally therethrough, said passage being of small diameter for part of its length between its ends and of larger diameter through each end part, one of the end parts of larger diameter being connectable with a pipe end, the other end part of larger diameter forming an open valve ball chamber having a bottom in the form of a frusto-conical annular valve seat defining the adjacent end of the small diameter portion of the passage, the valve unit when in use having the open valve ball chamber directed upwardly, a valve ball lying loosely in said chamber and resting on said seat to close the small diameter part of the passage, a float, means actuated by the float and coupled with the valve body to press said valve ball onto said seat when the float is moved in one direction and to relax the pressure on the ball to permit the latter to move away the seat when the float is oppositely moved, an elongate tubular skirt having the end of the valve body remote from the valve ball chamber secured therein, said skirt being formed to enclose a part of the pipe to which the valve body may be attached, an oblique liquid passage in the valve body opening at one end into the valve ball chamber at the side of said seat and discharging downwardly into said skirt at an angle to and against the wall thereof, and means for admitting air into the skirt above the discharge end of said oblique passage.

13. The invention according to claim 8, wherein the last stated means comprises a rod having a connection with the thrust means by which it may be longitudinally adjusted relative to the thrust means, said float being attached to one end of the rod, and a hollow body attached to the other end of the rod, said hollow body having an open bottom part, an aperture in its top and a flap valve attached to its top and overlying and closing the aperture.

14. The invention according to claim 12, with means in the skirt adjacent to the end remote from the valve body for reducing turbulence of liquid flowing through and from the skirt, comprising a ring of coiled strand material encircling the pipe.

15. In a float actuated inlet valve mechanism for a liquid receptacle such as a flush tank, trough and the like having an upstanding inlet pipe, an inlet valve connected to the pipe and having an open position and a shut-off position, float controlled means operatively coupled with the valve for regulating the opening and closing of the same, and means connected with and constraining the float controlled means to impart a snap action to the opening and closing of the valve, said float controlled means including a float rod and the last stated means comprising a hollow body attached to said rod and having a lower portion formed to admit liquid into the body as the liquid rises in the tank to trap air in the upper portion of the body and means for venting the trapped air from the upper portion of the body by the pressure of the liquid rising therein.

16. The invention according to claim 15, wherein said hollow body is attached to the rod for adjustment relative to the rod to change the control action of the hollow body with respect to predetermined high and low levels of liquid in the tank.

17. In a float actuated inlet valve mechanism for a liquid receptacle such as a flush tank, trough and the like having an upstanding inlet pipe, an inlet valve connected to the pipe and having an open position and a shut-off position, float controlled means operatively coupled with the valve for regulating the opening and closing of the same, and means connected with and constraining the float controlled means to impart a snap action to the opening and closing of the valve, said float controlled means including a rod and the last stated means comprising a hollow body and a clamping band secured to the rod and encircling the hollow body and movable to preselected positions thereon, said hollow body having a lower portion formed to admit liquid into the body as the liquid rises in the tank to trap air in the upper portion of the body and means for venting the trapped air from the upper portion of the body by the pressure of the liquid rising therein.

18. The invention according to claim 15, wherein said hollow body comprises a cylinder having a downwardly directed open bottom and having a top wall carrying said venting means.

19. The invention according to claim 15, wherein said hollow body comprises a cylinder having a lower end portion in the form of a tubular extension of reduced diameter open at its lower end to admit liquid into the body as the liquid rises in the tank to trap air in the upper portion of the body, and means for venting the trapped air from the upper portion of the body by the pressure of the liquid rising therein.

20. An inlet valve and float control mechanism comprising a valve unit including a body having a liquid passage therethrough, means for coupling the body at one end of the passage to a liquid supply pipe, a valve ball, means for supporting the ball in closing position relative to the other end of the passage, a bracket mounted on the valve body adjacent to the valve ball, said bracket embodying two spaced upstanding arms between which said valve ball is located, each of said arms comprising two spaced apart portions, an elongate lever plate having one end pivotally connected to and between the portions of one arm and extending across and in engagement with said valve ball and disposed between and extending beyond the portions of the other arm, a thrust element comprising a length of spring metal of band form bent upon itself to form two legs, each terminating in an angular tongue, said tongues being in overlapping relation, the band having an aperture through the bent portion thereof and the tongues having apertures arranged to be brought into alignment by springing the legs toward one another, said thrust element having one of said legs between and pivotally supported on the said portions of said other arm above and engaging the top of the lever, the thrust element when rocked in one direction forcing the lever against the ball to press the ball to valve closing position, a float, and a rod passing between the legs of the thrust element and through the aperture in the bent portion thereof and through the apertures in said tongues, said rod having the float attached to one end thereof.

21. The invention according to claim 20 with an air trapping and releasing means operatively coupled with the other end of said float rod and operating to alternately trap and release air by the rise and fall of the liquid level in the receptacle to restrain movements of the float by the rise and fall of the liquid level and impart a snap action to the opening and closing of the valve.

References Cited in the file of this patent

UNITED STATES PATENTS

| Number | Name | Date |
|---|---|---|
| 1,312,678 | Brien | Aug. 12, 1919 |
| 2,394,994 | Gibb | Feb. 19, 1946 |
| 2,487,490 | Sterrett | Nov. 8, 1949 |
| 2,737,968 | Lang | Mar. 13, 1956 |